United States Patent
Einig et al.

(10) Patent No.: US 6,953,230 B2
(45) Date of Patent: Oct. 11, 2005

(54) SYSTEM FOR CONTROLLING DRIVING DYNAMICS

(75) Inventors: Frank Einig, Koblenz (DE); Elmar Hoffmann, Kinheim (DE); Josef Knechtges, Mayen (DE); Michael Bleser, Plaidt (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/753,611

(22) Filed: Jan. 8, 2004

(65) Prior Publication Data

US 2004/0160121 A1 Aug. 19, 2004

Related U.S. Application Data

(63) Continuation of application No. PCT/EP02/07652, filed on Jul. 9, 2002.

(30) Foreign Application Priority Data

Jul. 10, 2001 (DE) .......................................... 101 32 576

(51) Int. Cl.[7] ................................................. B60T 8/60
(52) U.S. Cl. ........................ 303/146; 303/155; 303/186; 701/72
(58) Field of Search ................................ 303/140, 146, 303/147, 186, 155, 163, 165; 701/41, 48, 70, 72, 74, 75, 82, 84, 90; 180/197

(56) References Cited

U.S. PATENT DOCUMENTS

| | | | | | |
|---|---|---|---|---|---|
| 5,857,754 A | * | 1/1999 | Fukami et al. | ............... | 303/146 |
| 5,928,302 A | * | 7/1999 | Fukada | ........................ | 701/70 |
| 6,076,033 A | | 6/2000 | Hamada et al. | | |
| 6,415,215 B1 | * | 7/2002 | Nishizaki et al. | ............. | 701/70 |

FOREIGN PATENT DOCUMENTS

| | | |
|---|---|---|
| DE | 196 37 193 | 3/1997 |
| DE | 197 33 674 | 2/1999 |
| EP | 0 842 836 | 5/1998 |
| EP | 0 881 114 | 12/1998 |

* cited by examiner

*Primary Examiner*—Pam Rodriguez
(74) *Attorney, Agent, or Firm*—MacMillan, Sobanski & Todd, LLC

(57) ABSTRACT

The performance of a system for controlling vehicle-movement dynamics, which operates the braking system and the drive train of a vehicle in order to prevent lateral breakaway of the vehicle, is improved yet further for the case in which oversteering of the vehicle is to be compensated. To this end it is proposed, according to the invention, that a braking moment be produced on the front wheel on the outside of the bend by the braking system, and an additional drive moment be built up by the drive train on the driven wheels.

10 Claims, 1 Drawing Sheet

SYSTEM FOR CONTROLLING DRIVING DYNAMICS

CROSS REFERENCE TO RELATED APPLICATIONS

This application is a continuation of International Application No. PCT/EP02/07652 filed Jul. 9, 2002, the disclosures of which are incorporated herein by reference, and which claimed priority to German Patent Application No. 101 32 576.2 filed Jul. 10, 2001, the disclosures of which are incorporated herein by reference.

BACKGROUND OF THE INVENTION

The invention relates to a system for controlling vehicle-movement dynamics, which operates by means of the braking system and the drive train of a vehicle in order to prevent lateral breakaway of the vehicle.

A system for controlling vehicle-movement dynamics improves driving safety substantially beyond the advantages of the anti-lock braking system (ABS), which prevents locking of the wheels during braking, and of the drive-slip control, which prevents spinning of driven wheels, since it actively supports the driver in situations which are critical in respect of transverse dynamics. As is known, vehicle-movement dynamics control operates in braking systems in order actively to restore the driving stability, in the case of understeering or oversteering vehicle handling, through braking of individual wheels performed independently of the driver. Thus, active braking is performed on the rear wheel on the inside of the bend in the case of understeer, and on the front wheel on the outside of the bend in the case of oversteer. It is also known that the vehicle-movement dynamics control acts on the drive train in this context in order to reduce the drive moment, and drive slip, on the driven wheels through withdrawal of the engine torque if it is necessary to counteract understeer in the case of front-wheel drive vehicles or oversteer in the case of rear-wheel drive vehicles.

SUMMARY OF THE INVENTION

An object of the invention is to improve yet further the performance of an aforementioned system for controlling vehicle-movement dynamics, for the case in which oversteering of the vehicle is to be compensated.

It was proposed that, for the purpose of preventing oversteering of the vehicle, a braking moment be produced, by means of the braking system, on the front wheel on the outside of the bend, and an additional drive moment to be built up, by means of the drive train, on the driven wheels.

The great advantage of the invention is that, through the additional drive moment, a further component is produced which counteracts the yaw of the vehicle during oversteer. Substantially advantageous in this context is the fact that the further component produced through the additional drive moment acts on a wheel of the vehicle other than the front wheel, on the outside of the bend, to which the braking moment is applied. In the case of oversteer, the counter-moments are thereby displaced to several wheels, for the purpose of counteracting the vehicle yaw. Considered as a whole, the result is both an increase in safety, since the system performance is increased, and also an increase in comfort, since the control operation is performed more smoothly, and therefore with less reaction for the driver.

There is also no risk of the additionally built-up drive moment resulting in an excessively high slip on one or more driven wheels, which would further adversely affect the traction and the vehicle stability. Since the vehicle-movement dynamics control builds on the drive-slip control and makes shared used of components of the latter which are present in any case, a drive-slip control which, depending on the system design, is of a higher or lower order than the vehicle-movement dynamics control, can come into action if the slip on one or more driven wheels exceeds a predetermined value due to the additionally built-up drive moment.

The production of the braking moment on the front wheel on the outside of the bend and the build-up of the additional drive moment on the driven wheels could, in principle, be performed simultaneously.

According to a first preferred embodiment, the braking moment is first produced on the front wheel on the outside of the bend, and the additional drive moment is built up on the driven wheels only if the oversteer, or oversteer tendency, of the vehicle does not decrease after a predetermined period of time. Thus, there is a wait for a certain period of time to ascertain whether the driving behaviour is stabilized solely on the basis of the braking moment produced on the front wheel on the outside of the bend.

In order not to disturb the smooth control operation through load-change reactions which are perceptible by the driver, the additional drive moment on the driven wheels is built up only when the braking moment produced on the front wheel on the outside of the bend has attained a predetermined value.

The drive moment additionally built up on a driven wheel is preferably of an order of magnitude which is half that of the braking moment previously produced on the front wheel on the outside of the bend.

According to a second preferred embodiment, the additional drive moment is first built up on the driven wheels, and the braking moment is produced on the front wheel on the outside of the bend only if the oversteer of the vehicle does not decrease after a predetermined period of time. Thus, there is a wait for a certain period of time to ascertain whether the driving behaviour is stabilized solely on the basis of the additional drive moment built up on the driven wheels.

In order not to disturb the smooth control operation through load-change reactions which are perceptible by the driver, the braking moment produced on the front wheel on the outside of the bend is built up only when the additional drive moment on the driven wheels has attained a predetermined value.

The braking moment produced on the front wheel on the outside of the bend is preferably of an order of magnitude which is double that of the drive moment previously built up additionally on a driven wheel.

The system according to the invention can be used equally for vehicles with front-wheel, rear-wheel, or four-wheel drive. In the case of vehicles with four-wheel drive, in particular, it is no longer necessary for the purpose of vehicle-movement dynamics control to switch over to front-wheel drive by switching over the middle differential, with the result that the advantages of the system according to the invention are particularly applicable, since, in principle, the control operations implemented for front-wheel and rear-wheel drive can be superimposed for four-wheel drive.

An additional braking moment can be produced on the rear wheel on the outside of the bend, particularly when the additional drive moment is built up on the rear wheels, as is the case with a vehicle with rear-wheel or four-wheel drive. The drive moment additionally built up on the rear wheel on the outside of the bend is thereby compensated, with the result that the drive moment additionally built up on the rear wheel on the inside of the bend affords even greater support to the braking moment produced on the front wheel on the outside of the bend, in order to counteract the yaw of the vehicle in the case of oversteer.

In order to compensate completely the drive moment additionally built up on the rear wheel on the outside of the bend, the braking moment additionally produced on the rear wheel on the outside of the bend is set at an order of magnitude which is equal to that of the drive moment previously built up on the rear wheel on the inside of the bend.

If there is to be a wait to ascertain whether the driving behaviour is stabilized without producing the additional braking moment on the rear wheel on the outside of the bend, the additional braking moment may be produced on the rear wheel on the outside of the bend only if the oversteer of the vehicle does not decrease after a predetermined period of time.

In order to prevent load-change reactions which are perceptible by the driver, it is possible for the additional braking moment to be produced on the rear wheel on the outside of the bend only when the drive moment produced on the rear wheel on the outside of the bend has attained a predetermined value.

Various objects and advantages of this invention will become apparent to those skilled in the art from the following detailed description of the preferred embodiment, when read in light of the accompanying drawings.

DETAILED DESCRIPTION OF THE INVENTION

Figure 3:
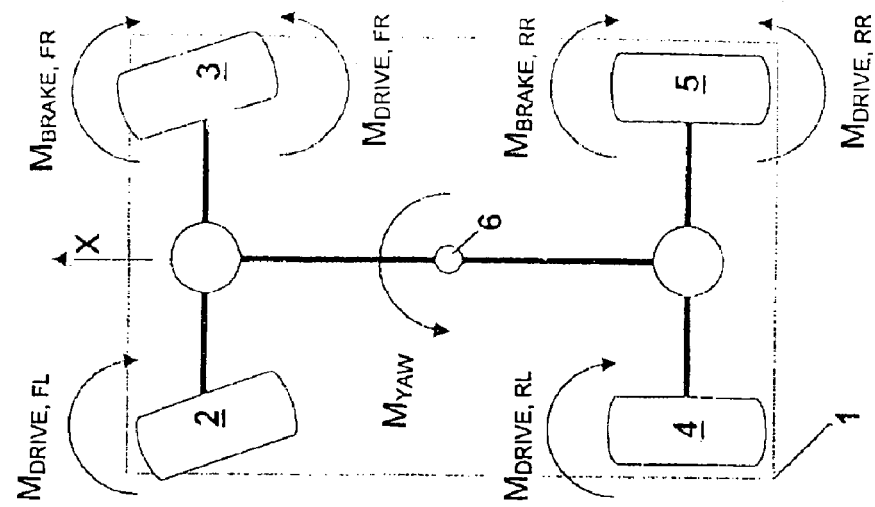
FIG. 3 shows the exemplary embodiment for a four-wheel drive vehicle.
Figure 2:
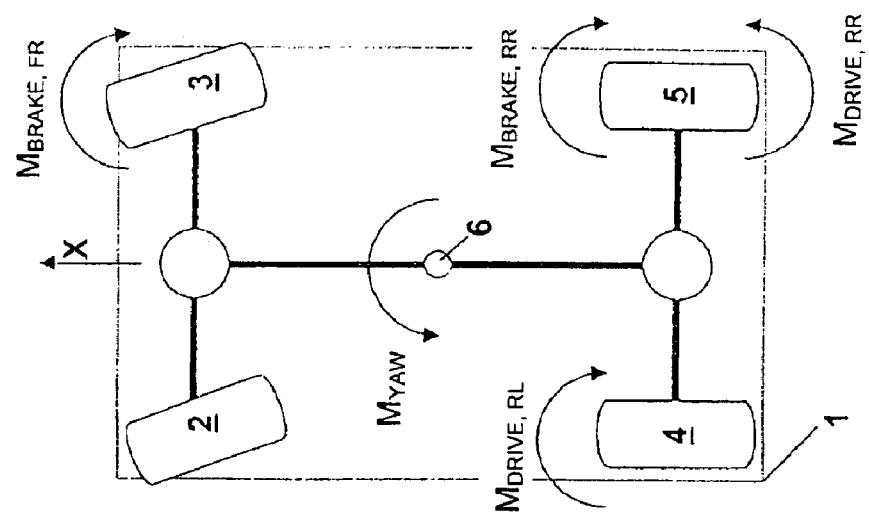
FIG. 2 shows the exemplary embodiment for a rear-wheel drive vehicle.
Figure 1:
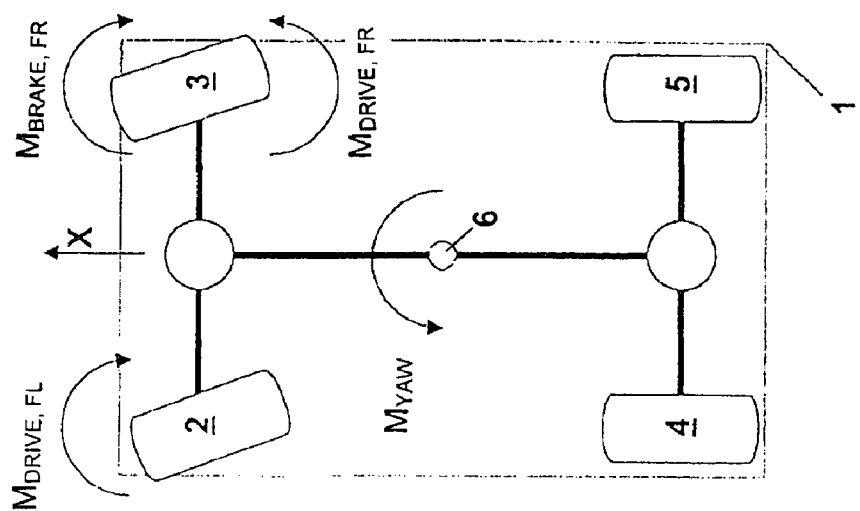
FIG. 1 shows the exemplary embodiment for a front-wheel drive vehicle.

The schematically represented vehicles 1 in FIGS. 1 to 3 are identical to one another. The vehicle 1 has a left and a right steerable front wheel 2, 3, and a left and right rear wheel 4, 5. The vehicle 1 moves forward in the direction of travel X, the steerable front wheels 2, 3 being locked to the left, so that, for the exemplary embodiment, the vehicle 1 is travelling through a left-hand bend. In this case, oversteer causes the rear of the vehicle 1 to break away laterally to the right, with the result that the vehicle 1 travels through a lesser bend radius than that corresponding to the left lock of the front wheels 2, 3.

In the case of a vehicle-movement dynamics control, the yaw $M_{YAW}$ of the vehicle 1 about its vertical axis 6 and the left lock, or steering angle, of the front wheels 2, 3 determined by the driver are recorded and evaluated, inter alia, for the purpose of early detection of oversteer. If oversteer is detected, there is built up on the front wheel on the outside of the bend, by means of the braking system, a braking moment $M_{BRAKE}$ which counteracts the yaw $M_{YAW}$ of the vehicle 1 about its vertical axis 6, in order to stabilize the behaviour of the vehicle.

Since, in the exemplary embodiment, the vehicle 1 is travelling through a left-hand bend, a braking moment $M_{BRAKE, FR}$ is built up on the right front wheel 3.

According to the invention, in addition to the braking moment $M_{BRAKE}$ on the front wheel on the outside of the bend, a drive moment $M_{DRIVE}$ is built up on the driven wheels. How this behaves with the different drive types is explained in the following.

FIG. 1—Front-wheel Drive

In the case of a front-wheel drive vehicle, there are additionally produced a drive moment $M_{DRIVE, FL}$ on the left front wheel 2 and a drive moment $M_{DRIVE, FR}$ on the right front wheel 3. Although, on the right front wheel 3, the braking moment $M_{BRAKE, FR}$ is weakened to a "certain extent" by the additional drive moment $M_{DRIVE, FR}$, there is nevertheless produced through the additional drive moment $M_{DRIVE, FL}$ on the left front wheel 2 a further component which counteracts the yawing moment $M_{YAW}$ of the vehicle 1 about its vertical axis 6.

There is preferably built up on the driven front wheels 2, 3 an additional total drive moment $M_{DRIVE, TOTAL}$ which corresponds to the braking moment $M_{BRAKE, FR}$ set on the front wheel 3 on the outside of the bend, i.e., $M_{DRIVE, TOTAL} = M_{BRAKE, FR}$. The total drive moment $M_{DRIVE, TOTAL}$ is distributed equally to the driven front wheels 2, 3, with the result that, for the wheel drive moments, $M_{DRIVE, FL} = M_{DRIVE, FR} = \frac{1}{2} M_{BRAKE, FR}$. Consequently, on the front wheel 3 on the outside of the bend, the braking moment $M_{BRAKE, FR}$ is reduced by half through the additional drive moment $M_{DRIVE, FR}$. Since an additional drive moment $M_{DRIVE, FL}$, corresponding to the reduction of the braking moment $M_{BRAKE, FR}$ on the front wheel 3 on the outside of the bend, is available in parallel on the front wheel 2 on the inside of the bend, the moment balance as a whole is at least neutral, in order to counteract the yawing moment $M_{YAW}$ of the vehicle 1 about its vertical axis 6. Even if a greater counter-yaw moment is not necessarily produced, it is essential to the invention that the yawing moment $M_{YAW}$ of the vehicle 1 in the case of oversteer is counteracted equally via both front wheels 2, 3, instead of via only the front wheel 3 on the outside of the bend. Consequently, not only is the driving stability restored more rapidly, but the control operation as a whole also-proceeds more smoothly.

FIG. 2—Rear-wheel Drive

In the case of a rear-wheel drive vehicle, there are additionally produced a drive moment $M_{DRIVE, RL}$ on the left rear wheel 4 and a drive moment $M_{DRIVE, RR}$ on the right rear wheel 5. Through the additional drive moment $M_{DRIVE, RL}$ on the left rear wheel 4, a further component is produced which counteracts the yawing moment $M_{YAW}$ of the vehicle 1 about its vertical axis 6. The drive moment $M_{DRIVE, RR}$ produced on the right rear wheel 5 in this case weakens to a "certain extent" the further component produced by the additional drive moment $M_{DRIVE, RL}$ on the left rear wheel 4. In order to counteract it, the drive moment $M_{DRIVE, RR}$ produced on the right rear wheel 5 can at least be compensated in that an additional braking moment $M_{BRAKE, RR}$ is built up on the right rear wheel 5, with the result that the drive moment $M_{DRIVE, RL}$ produced on the left rear wheel 4 counteracts to an even greater degree the yawing moment $M_{YAW}$ of the vehicle 1 about its vertical axis 6.

There is preferably built up on the driven rear wheels 4, 5 an additional total drive moment $M_{DRIVE, TOTAL}$ which corresponds to the braking moment $M_{BRAKE, FR}$ set on the front wheel 3 on the outside of the bend, i.e., $M_{DRIVE, TOTAL} = M_{BRAKE, FR}$. The total drive moment $M_{DRIVE, TOTAL}$ is distributed equally to the driven rear wheels 4, 5, with the result that, for the wheel drive moments, $M_{DRIVE, RL} = M_{DRIVE, RR} = \frac{1}{2} M_{BRAKE, FR}$. In order to compensate the drive moment $M_{DRIVE, RR}$ produced on the rear wheel 5 on the outside of the bend, there is preferably built up on the rear wheel 5 on the outside of the bend an additional braking moment $M_{BRAKE, RR}$ which corresponds to half of the braking moment $M_{BRAKE, FR}$ set on the front wheel 3 on the outside of the bend, i.e., $M_{BRAKE, RR} = M_{DRIVE, RR} = \frac{1}{2} M_{BRAKE, FR}$. An additional counter-yaw moment is thereby made available through the drive moment $M_{DRIVE, RL}$ produced on the rear wheel 4 on the inside of the bend. Essential to the invention, however, is the fact that the yawing moment $M_{YAW}$ of the vehicle 1 in the case of oversteer is counteracted via both rear wheels 4, 5, or at least the rear wheel 4 on the inside of the bend and the front wheel 3 on the outside of the bend, instead of via only the front wheel 3 on the outside of the bend, with the result that the control operation as a whole proceeds more smoothly and the driving stability is restored more rapidly.

FIG. 3—Four-wheel Drive

In the case of a four-wheel drive vehicle, there are additionally produced on the left front wheel 2 a drive moment $M_{DRIVE, FL}$), on the right front wheel 3 a drive moment $M_{DRIVE, FR}$) on the left rear wheel 4 a drive moment $M_{DRIVE, RL}$ and on the right rear wheel 5 a drive moment $M_{DRIVE, RR}$. Through the additional drive moments $M_{DRIVE, FL}$, $M_{DRIVE, RL}$ on the left front and rear wheels 2, 4, further components are produced which counteract the yawing moment $M_{YAW}$ of the vehicle 1 about its vertical axis 6. In this case, likewise, the additional drive moments $M_{DRIVE, FR}$, $M_{DRIVE, RR}$ on the right front and rear wheels 3, 5 weaken the counter-components to a "certain extent". In order at least to compensate this, an additional braking moment $M_{BRAKE, FR}$ can be built up, in this case likewise, on the right rear wheel 5.

Viewed as a whole, in the case of a vehicle with four-wheel drive, the control operations in front-wheel and rear-wheel drive are superimposed. Consequently, the yawing moment $M_{YAW}$ of the vehicle 1 in the case of oversteer is counteracted via both front wheels 2, 3 and both rear wheels 4, 5, or at least the rear wheel 4 on the inside of the bend, instead of via only the front wheel 3 on the outside of the bend, with the result that a smooth control operation is achieved and the driving stability is restored more rapidly.

It is mentioned, in connection with the explanation of FIGS. 1 to 3, that the drive moment(s) can be weakened to a "certain extent". This quantity is determined, substantially, by vehicle parameters in the stationary and dynamic states, such as, for example, the track width, axle base, steering angle, centre of gravity and axle load distribution, as well as other influences, such as, for example, the condition of the driving surface.

How the braking moment additionally produced on the front wheel on the outside of the bend and the drive moment additionally built up on the driven wheels are set, in respect of both order of magnitude and course (e.g. stepped or sloped), are determined from the variation of the left lock, or steering angle, determined by the driver, from the actual yaw of the vehicle about its vertical axis, the time derivatives (yaw velocities) of this variation-also being used. In addition, the aforementioned vehicle parameters in the stationary and dynamic states are taken into account.

Although, in the exemplary embodiment, travel through a left-hand bend is considered, it is in any case easily comprehensible to an expert how the invention takes effect in the case of travel through a right-hand bend, the rear of the vehicle, in the case of oversteer, braking away laterally to the left and, and a braking moment being first built up on the left front wheel for the purpose of stabilizing the driving behaviour.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. System for controlling vehicle-movement dynamics, which operates by means of the braking system and the drive train of a vehicle in order to prevent lateral breakaway of the vehicle, a braking moment being produced, by means of the braking system, on the front wheel on the outside of the bend, and an additional drive moment being built up, by means of the drive train, on the driven wheels, for the purpose of preventing oversteering of the vehicle, wherein a higher-order or lower-order drive-slip control comes into action if the slip on one or more driven wheels exceeds a predetermined value due to the additionally built-up drive moment, and wherein the braking moment is first produced on the front wheel on the outside of the bend, and the additional drive moment is built up on the driven wheels only if the oversteer of the vehicle does not decrease after a predetermined period of time.

2. System according to claim 1, wherein the additional drive moment on the driven wheels is built up only when the braking moment produced on the front wheel on the outside of the bend has attained a predetermined value.

3. System according claim 1, wherein the drive moment additionally built up on a driven wheel is of an order of magnitude which is half that of the braking moment previously produced on the front wheel on the outside of the bend.

4. System according to claim 1, wherein the additional drive moment is first built up on the driven wheels, and the braking moment is produced on the front wheel on the outside of the bend only if the oversteer of the vehicle does not decrease after a predetermined period of time.

5. System according to claim 1, wherein the braking moment produced on the front wheel on the outside of the bend is built up only when the additional drive moment on the driven wheels has attained a predetermined value.

6. System according to claim 5, wherein the braking moment produced on the front wheel on the outside of the bend is of an order of magnitude which is double that of the drive moment previously built up additionally on a driven wheel.

7. System according to claim 1, wherein an additional braking moment is produced on the rear wheel on the outside of the bend when the additional drive moment is built up on the rear wheels.

8. System according to claim 7, wherein the braking moment additionally produced on the rear wheel on the outside of the bend is of an order of magnitude which is equal to that of the drive moment previously built up on the rear wheel on the inside of the bend.

9. System according to claim 7, wherein the additional braking moment is produced on the rear wheel on the outside of the bend only if the oversteer of the vehicle does not decrease after a predetermined period of time.

10. System according to claim 7, wherein the additional braking moment is produced on the rear wheel on the outside of the bend only when the drive moment produced on the rear wheel on the outside of the bend has attained a predetermined value.

* * * * *